(12) United States Patent
Kimura

(10) Patent No.: US 10,723,008 B2
(45) Date of Patent: Jul. 28, 2020

(54) HYDRAULICALLY-ACTUATED DEVICE

(71) Applicant: KABUSHIKI KAISHA OGURA, Ebina-Shi (JP)

(72) Inventor: Kiyoshi Kimura, Fujisawa (JP)

(73) Assignee: Kabushiki Kaisha Ogura, Kanagawa-Ken (JP)

( * ) Notice: Subject to any disclaimer, the term of this patent is extended or adjusted under 35 U.S.C. 154(b) by 176 days.

(21) Appl. No.: 15/746,827

(22) PCT Filed: Oct. 4, 2016

(86) PCT No.: PCT/JP2016/079486
§ 371 (c)(1),
(2) Date: Jan. 23, 2018

(87) PCT Pub. No.: WO2017/061425
PCT Pub. Date: Apr. 13, 2017

(65) Prior Publication Data
US 2018/0215030 A1 Aug. 2, 2018

(30) Foreign Application Priority Data
Oct. 5, 2015 (JP) .................. 2015-197922

(51) Int. Cl.
*B25F 5/00* (2006.01)
*B25F 3/00* (2006.01)
(Continued)

(52) U.S. Cl.
CPC ............ *B25F 5/001* (2013.01); *B23B 45/003* (2013.01); *B24B 23/005* (2013.01); *B25F 3/00* (2013.01);
(Continued)

(58) Field of Classification Search
CPC .. B25F 5/001; B25F 5/005; B25F 3/00; B23B 45/003; B23B 45/008; B24B 23/005;
(Continued)

(56) References Cited

U.S. PATENT DOCUMENTS 3,059,583 A * 10/1962 Huber ................. F04C 5/00
417/410.3
4,735,048 A * 4/1988 Gregory ............. B21J 15/105
417/443
(Continued)

FOREIGN PATENT DOCUMENTS

| CN | 202901105 U | 4/2013 |
| JP | 58-067618 U | 5/1983 |

(Continued)

OTHER PUBLICATIONS

International Search Report and Written Opinion (Application No. PCT/JP2016/079486) dated Dec. 20, 2016.
(Continued)

*Primary Examiner* — Chelsea E Stinson
*Assistant Examiner* — Himchan "Aiden" Song
(74) *Attorney, Agent, or Firm* — Burr & Brown, PLLC

(57) ABSTRACT

A one-way clutch is provided at the end of the rotary shaft of the hydraulic pump, which can receive the rotary shaft of the drive unit. The one-way clutch has spring-urged rollers, balls or sprags, which are urged by springs, and which are brought into direct contact with the drive shaft of the drive unit when the drive shaft of the drive unit is received in the one-way clutch.

4 Claims, 4 Drawing Sheets

(51) Int. Cl.
 B23B 45/00 (2006.01)
 F16D 41/067 (2006.01)
 B24B 23/00 (2006.01)
 F16D 41/069 (2006.01)
 A62B 3/00 (2006.01)
 B25D 16/00 (2006.01)

(52) U.S. Cl.
 CPC ............ B25F 5/005 (2013.01); F16D 41/067 (2013.01); F16D 41/069 (2013.01); A62B 3/005 (2013.01); B23B 45/008 (2013.01); B25D 16/003 (2013.01); B25D 16/006 (2013.01)

(58) Field of Classification Search
 CPC ... B25D 16/003; B25D 16/006; F16D 41/067; F16D 41/069; A62B 3/005; H01R 43/0427; F04C 5/00; B25B 27/14; F01B 3/00; B21D 37/10; B21J 9/14; B21J 60/477
 USPC ...................................... 173/213, 140, 13–17
 See application file for complete search history.

(56) References Cited

U.S. PATENT DOCUMENTS

| | | | | |
|---|---|---|---|---|
| 5,209,153 | A * | 5/1993 | Araki | B25B 7/126 269/238 |
| 6,000,680 | A * | 12/1999 | Kimura | B23D 29/00 254/93 R |
| 2004/0165985 | A1 * | 8/2004 | Satoh | F01P 3/202 415/206 |
| 2005/0120770 | A1 | 6/2005 | Frenken | |
| 2005/0223886 | A1 * | 10/2005 | Oide | B23D 15/14 91/428 |
| 2013/0000132 | A1 * | 1/2013 | Bergquist | B27B 17/08 30/381 |
| 2014/0034149 | A1 * | 2/2014 | Kimura | F16L 37/32 137/315.01 |
| 2016/0256993 | A1 * | 9/2016 | Noack | B23Q 5/027 |
| 2016/0368128 | A1 | 12/2016 | Uchiyama et al. | |
| 2019/0039194 | A1 * | 2/2019 | Rischen | B25B 27/10 |
| 2019/0145434 | A1 * | 5/2019 | Kimura | B23D 29/00 137/636.1 |

FOREIGN PATENT DOCUMENTS

| | | |
|---|---|---|
| JP | 63-133585 U | 9/1988 |
| JP | H04-122494 U | 11/1992 |
| JP | 2542824 Y2 | 7/1997 |
| JP | 2008-232320 A1 | 10/2008 |
| JP | 2008232320 A * | 10/2008 |
| JP | 2010-280011 A1 | 12/2010 |
| WO | 03/084719 A2 | 10/2003 |
| WO | 03/084719 A3 | 10/2003 |
| WO | 2004/082878 A1 | 9/2004 |
| WO | 2015/087397 A1 | 6/2015 |

OTHER PUBLICATIONS

English translation of International Preliminary Report on Patentability (Chapter I) (Application No. PCT/JP2016/079486) dated Apr. 19, 2018, 6 pages.
Extended European Search Report (Application No. 16 85 3579.7) dated May 7, 2019.
Chinese Office Action (with English translation), Chinese Application No. 201680018174.8, dated Mar. 3, 2020 (12 pages).

* cited by examiner

HYDRAULICALLY-ACTUATED DEVICE

BACKGROUND OF THE INVENTION

Field of the Invention

The present invention relates to a hydraulically-actuated device including a tool unit having a hydraulic pump for generating hydraulic pressure by rotating a rotating part and a tool operated by hydraulic pressure generated by the hydraulic pump, and a drive unit having a motor for rotating the rotating part of the hydraulic pump and detachably attached to the tool unit.

Description of Related Art

Portable hydraulically-actuated devices have been used for rescue purposes, and an example thereof is described in Patent Document 1 (Japanese Patent Application Laid-Open Publication No. 2010-280011). The hydraulically-actuated device described in Patent Document 1 includes: a hydraulic pressure generating unit having a battery, an electric motor supplied with electric power from the battery, and a hydraulic pump driven by the electric motor; and a head unit which is detachably attached to the hydraulic pressure generating unit and which is provided with an end tool driven by the hydraulic pressure generated by the hydraulic pressure generating unit. Various kinds of tools such as a cutter and a spreader are prepared as the end tool provided on the head unit. It is possible to deal with various kinds of work by exchanging the head unit. Further, by making the hydraulic pressure generating unit and the head unit separable, it is possible to improve the portability and reduce the burden on the workers in the field. In the case of adopting the above configuration, a hydraulic coupling is provided between the hydraulic pressure generating unit and the head unit.

It is conceivable to constitute a portable hydraulically-actuated device by a drive unit including an electric motor, and a head unit (tool unit) which is detachably attached to the drive unit and which includes a hydraulic pump driven for rotation by the electric motor of the drive unit and an end tool operated by hydraulic pressure generated by the hydraulic pump. In this case, it is necessary to provide a separable torque transmission coupling for transmitting torque from the drive side rotary shaft to the driven side rotary shaft between the drive unit and the head unit.

Considering the rescue application, it is necessary to quickly couple and separate the torque transmission coupling. A torque transmission coupling of a meshing type (key/key groove type, dog clutch type, etc.) requires rotational phase alignment between the driving side rotary shaft and the driven side rotary shaft at the time of coupling, and thus it takes time to perform the coupling operation. If a magnetic coupling is used as a torque transmission coupling, the separation operation becomes troublesome, the structure becomes complicated, and the cost increases.

PRIOR ART DOCUMENTS

Patent Documents

PATENT DOCUMENT 1: JP2010-280011A

SUMMARY OF THE INVENTION

The object of the present invention is to provide a hydraulically-actuated device having a torque transmission coupling, which can easily couple and separate a rotary shaft of a tool unit and a rotary shaft of a drive unit, and which can be realized at low cost.

In one embodiment of the present invention, there is provided a hydraulically-actuated device comprising: a tool unit having a hydraulic pump that generates hydraulic pressure by rotating a rotating part of the hydraulic pump, and a tool operated by the hydraulic pressure generated by the hydraulic pump; and a drive unit detachably attached to the tool unit, the drive unit having a rotary motor that drives the rotary parts of the hydraulic pump for rotation, wherein the drive unit has a rotary shaft rotated by the rotary motor, wherein the hydraulic pump of the tool unit has a rotary shaft connected to the rotating part, wherein, an end of the rotary shaft of one of the drive unit and the hydraulic pump is provide with a one-way clutch capable of receiving the rotary shaft of the other of the drive unit and the hydraulic pump, and wherein the one-way clutch has rollers, balls or sprags, which are urged by springs, and which are brought into direct contact with the rotary shaft of the other of the drive unit and the hydraulic pump when the rotary shaft of the other of the drive unit and the hydraulic pump is received in the one-way clutch.

According to the above-described embodiment of the present invention, by inserting the rotary shaft of the drive unit or the hydraulic pump into the one-way clutch and rotating (applying a torque to) the rotary shaft of the drive unit in a predetermined direction, the one-way clutch is brought into a locked state so that a torque transmitting connection is established between the rotary shaft of the drive unit and the rotary shaft of the hydraulic pump. That is, torque transmitting connection can be established by a very simple operation. In addition, by stopping the rotation of the rotary shaft of the drive unit (by removing the torque), the torque transmitting connection is released so that the rotary shaft of the drive unit can be easily pulled out.

DETAILED DESCRIPTION OF THE INVENTION

Embodiments of the present invention will be described below with reference to the accompanying drawings.

Figure 1:
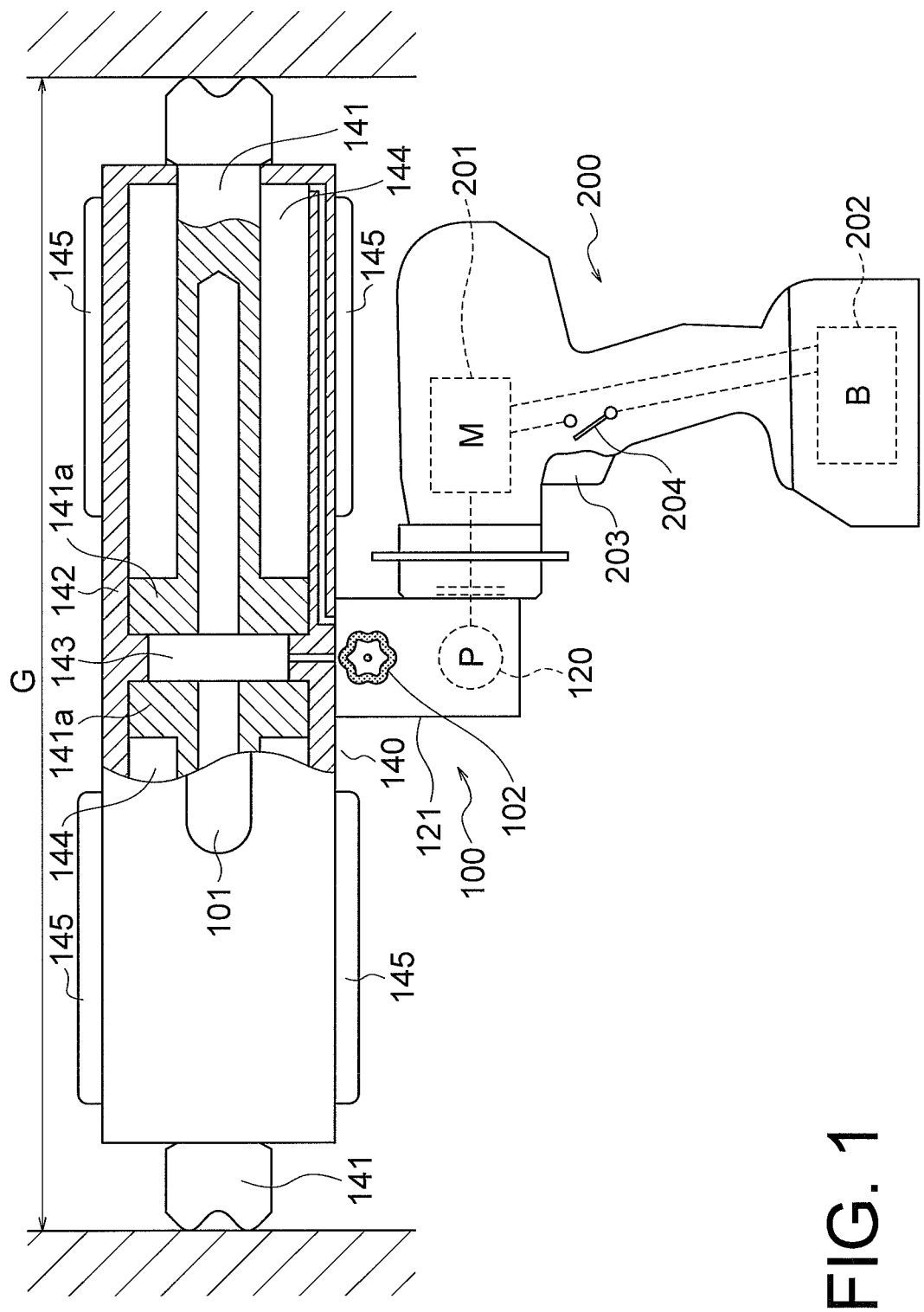
FIG. 1 is a schematic partial sectional view showing the overall configuration of a hydraulically-actuated device.

As shown in FIG. 1, a rescue device of a hydraulically-actuated type (hydraulically-actuated device) composed of: a tool unit 100 formed by integrating a hydraulic pump 120 and a tool 140 operated by a hydraulic pressure generated by the hydraulic pump; and drive unit 200 incorporating an electric motor 201, which is a rotary motor for driving the hydraulic pump 120. The drive unit 200 is detachably attached to the tool unit 100.

The hydraulically-actuated device shown in FIG. 1 designed under the intension that the device is used to create a space for rescuing a person, to lift a heavy object, destroying an obstructive object, and so on, by operating the device such that a pair of push rods 141 of the tool 140 of the tool unit 100 are separated from each other.

In the most basic mode of use of the hydraulically-actuated device, one worker at first places the tool unit 100 within a gap G to be expanded, while the tool unit 100 is separated from the drive unit 200. At this time, if necessary, the holding handle 101 schematically shown in FIG. 1 can be used. In this state, another worker couples the rotary shaft of the drive unit 200 to the rotary shaft of the tool unit 100, and actuates the drive unit 200. The hydraulically-actuated device in the present embodiment is provided with a torque transmission coupling structure capable of establishing a torque transmission connection and releasing the connection (separation) between the two rotary shafts.

Figure 2:
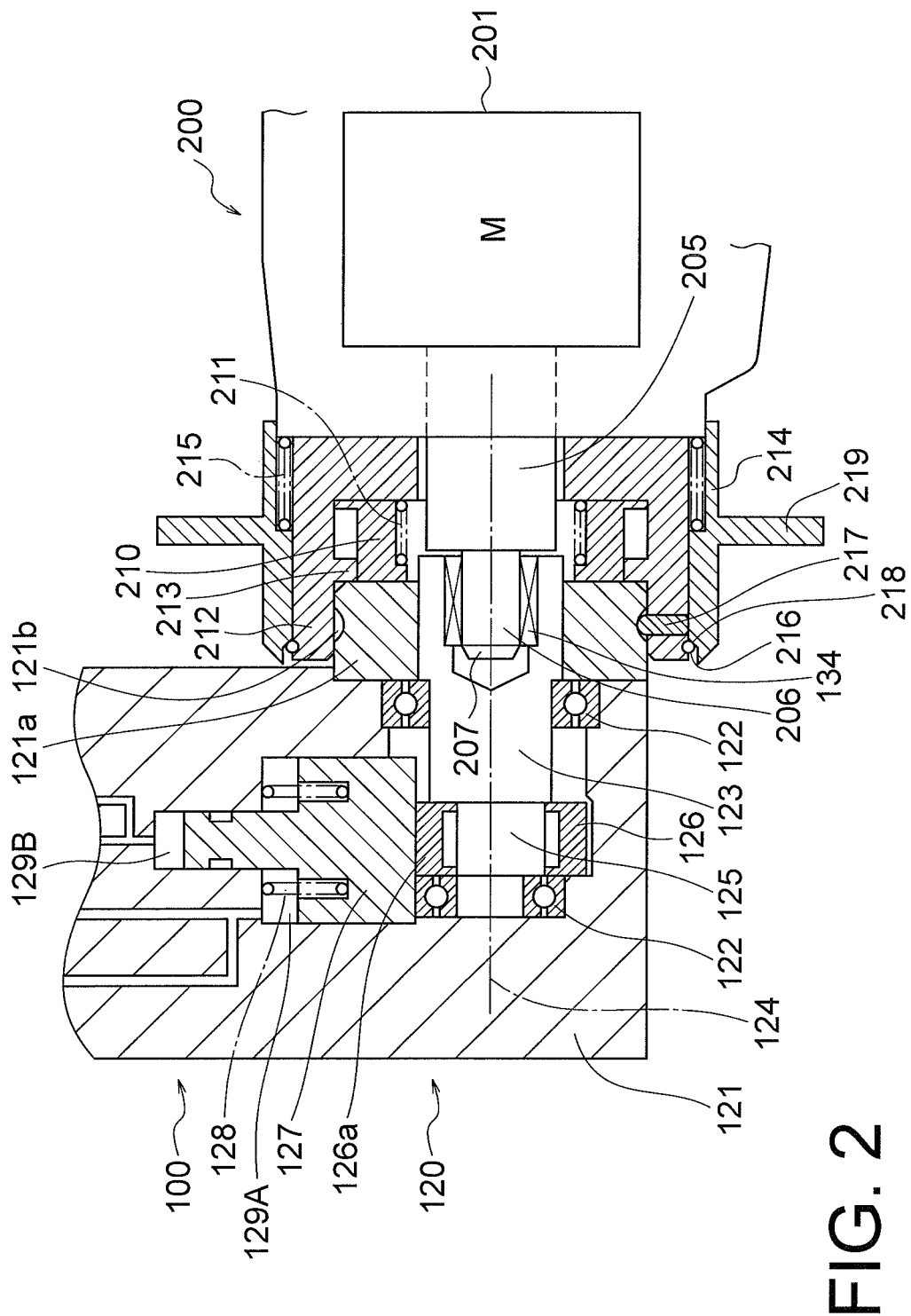
FIG. 2 is a cross-sectional view showing a torque transmission coupling structure of the hydraulically-actuated device, showing the coupled state of the joint.

First, the tool unit 100 will be described. As shown in FIG. 2, the hydraulic pump 120 has a block body 121 forming a casing of the hydraulic pump. A rotary shaft 123 is rotatably supported in a hole formed in the block body 121 via a bearing 122. The rotary shaft 123 has an eccentric portion 125 eccentric with respect to a rotational axis 124 of the rotary shaft 123. A bearing 126 (a needle roller bearing in the illustrated embodiment) is attached to the eccentric portion 125.

The block body 121 also has a cavity for accommodating a piston 127. The piston 127 is constantly pressed against an outer race 126*a* of the bearing 126 by a spring 128. Accordingly, as the rotary shaft 123 rotates, the outer race 126*a* of the bearing 126 rotates eccentrically to function as a cam so that the piston 127 moves up and down. As a result, pressure oil is sent from a large oil chamber 129A or a small oil chamber 129B of the hydraulic pump 120 toward the tool 140 so that the tool 140 operates.

As shown in FIG. 1, the tool 140 has a cylinder 142 and the pair of push rods 141 disposed in the cylinder 142. Each push rod 141 is provided with a piston portion 141*a* integral with the push rod. In the cylinder 142, a first oil chamber 143 is formed between the piston portions 141*a* of the push rods 141, and second oil chambers 144 are respectively formed on sides of the piston portions 141*a* opposite the first oil chamber 143. By supplying pressure oil to the first oil chamber 143, the two push rods 141 move so as to be separated from each other in the left-right direction in the drawing; on the other hand, by supplying pressure oil to the two second oil chambers 144, the two push rods 141 move so as to approach to each other.

An oil reservoir 145 serving as a tank in a hydraulic circuit to be described later is provided around the cylinder 142. For example, the space between the cylinder 142 and a rubber tubular body covering the circumference of the cylinder 142 may serve as the oil reservoir 145.

Next, a hydraulic circuit for supplying pressure oil from the hydraulic pump 120 to the tool 140 will be described with reference to FIG. 4. Two symbol marks indicating the pumps in the hydraulic circuit diagram of FIG. 4 show the pumping function of the large oil chamber 129A and the small oil chamber 129B of the hydraulic pump 120.

Figure 4:
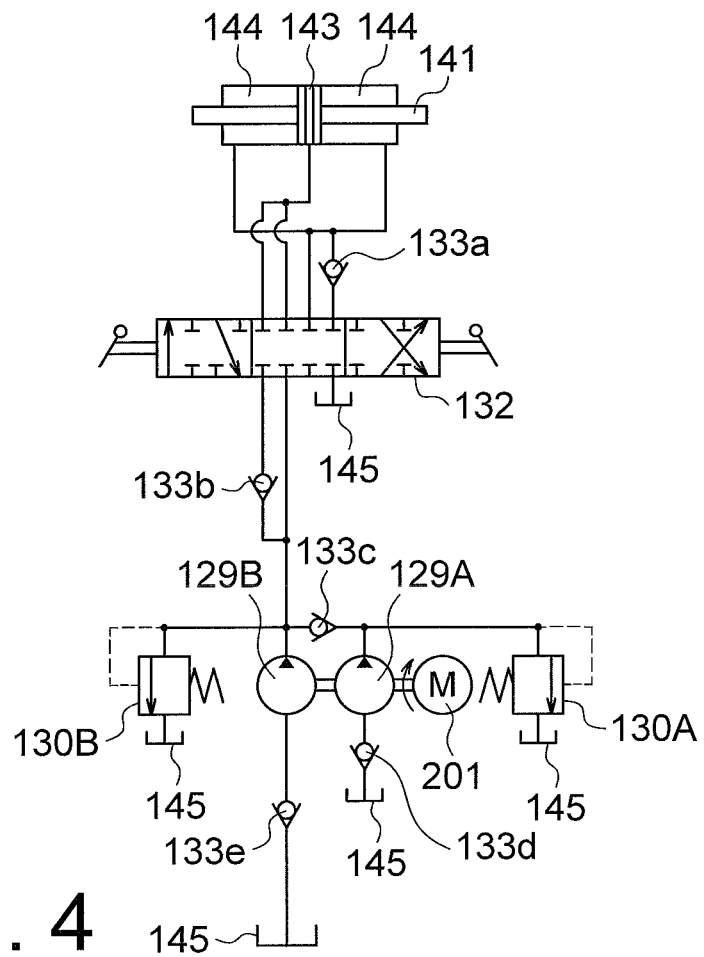
FIG. 4 is a hydraulic circuit diagram including hydraulic pump and tool.

In the hydraulic circuit diagram shown in FIG. 4, reference sign 132 denotes a directional control valve of a rotary type. The directional control valve 132 is built in the vicinity of a dial (rotary knob) 102 on the block body 121 shown in FIG. 1, and can be operated by rotating the dial 102. When the directional control valve 132 is shifted rightward in FIG. 4 from the neutral position shown in the hydraulic circuit diagram of in FIG. 4, pressure oil can be supplied to the first oil chamber 143 in the cylinder 142. When the directional control valve 132 is shifted leftward, pressure oil can be supplied to the second oil chambers 144.

Reference sign 130A denotes a low pressure relief valve, and reference sign 130B denotes a high pressure relief valve. Reference signs 133*a*, 133*b*, 133*c*, 133*d*, 133*e* denote check valves.

As is apparent from the hydraulic circuit diagram of FIG. 4, at a stage before the pressure in the oil chamber 129A (129B) rises, oil chamber(s) 143(144) of the cylinder 142 is filled with pressure oil discharged from the large oil chamber 129A that can achieve a large discharge rate and the small oil chamber 129B. At a stage after the pressure in the oil chamber 129A(129B) has increased to a certain level, the oil chamber(s) 143(144) in the cylinder 142 is filled with pressure oil discharged from the small oil chamber 129A that can achieve a high discharge pressure.

As shown in FIG. 1, a direct-current power source, such as a battery 202 comprising a secondary battery such as a lithium-ion battery or a nickel-hydrogen battery, is detachably attached to the drive unit 200. By pulling the trigger 203, the electric switch 204 is closed, and power is supplied from the battery 202 to the above-described motor 201, whereby the motor 201 can be rotated.

Figure 3:
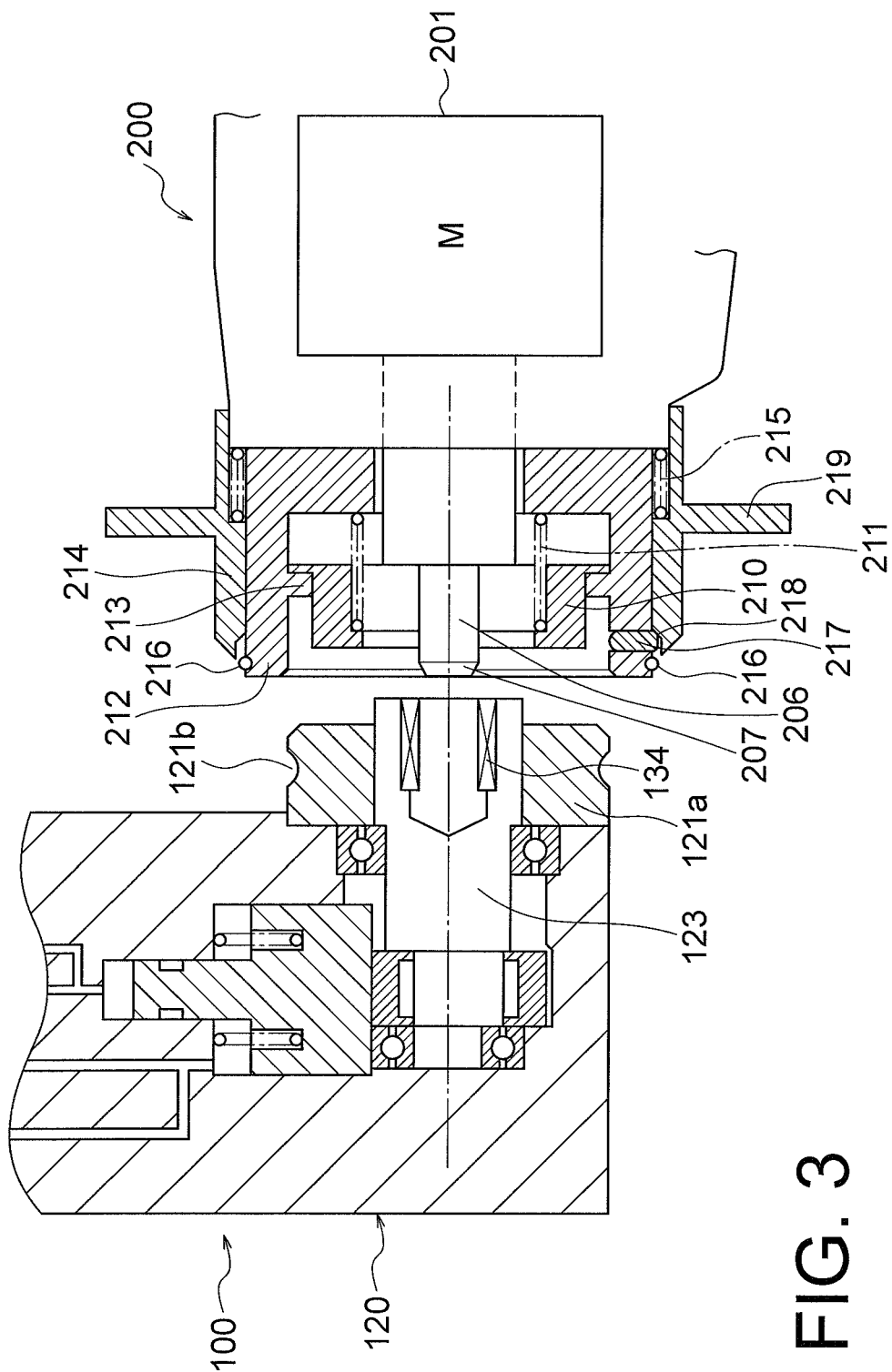
FIG. 3 is a cross-sectional view showing the torque transmission coupling structure of the hydraulically-actuated device, showing the separated state the coupling.

As shown in FIGS. 2 and 3, the rotary shaft 205 of the motor 201 has a cylindrical insertion portion 206 at its distal end portion. A taper 207 is provided at the distal end part of the insertion portion 206 for smooth insertion. On the other hand, formed at the distal end portion of the rotary shaft 123 of the hydraulic pump 120 is a hole, in which a one-way clutch 134 is mounted.

The configuration of the one-way clutch 134 used herein is well known per se. That is, as shown in FIG. 5, the one-way clutch 134 includes a plurality of needles (needle rollers) 135; a retainer 136 that retains the needles 135 so as not to fall off from the retainer 136 when the insertion portion 206 of the rotary shaft 205 is not inserted in the one-way clutch 134; an outer race 137 having an inner circumference with cam surfaces 138 respectively corresponding to the needles 138; and springs 139 each urge respective one of the needles 135 so as to maintain a condition where the needles 135 are in contact with the insertion portion 206 of the rotary shaft 205.

The outer race 137 is press-fitted into the hole at the distal end portion of the rotary shaft 123 of the hydraulic pump 120, so that the outer race 137 and the rotary shaft 123 are not rotatable relative to each other. The outer race 137 and the rotary shaft 123 may be rendered non-rotatable relative to each other by a method other than press fitting.

The outer diameter of the insertion portion 206 of the rotary shaft 205 of the motor 201 is preferably set to be slightly larger than a diameter of a circle passing through points P on the circumference of the respective needles 135 nearest from the center axis of the one-way clutch 134 when the insertion portion 206 is not inserted into the one-way clutch 134. When an attempt to insert the insertion portion 206 into the one-way clutch 134 is made, the needle 135 is displaced in the clockwise direction in FIG. 5 against the force of the spring 139, so that the insertion portion 206 can be inserted into the one-way clutch 134.

Figure 5:
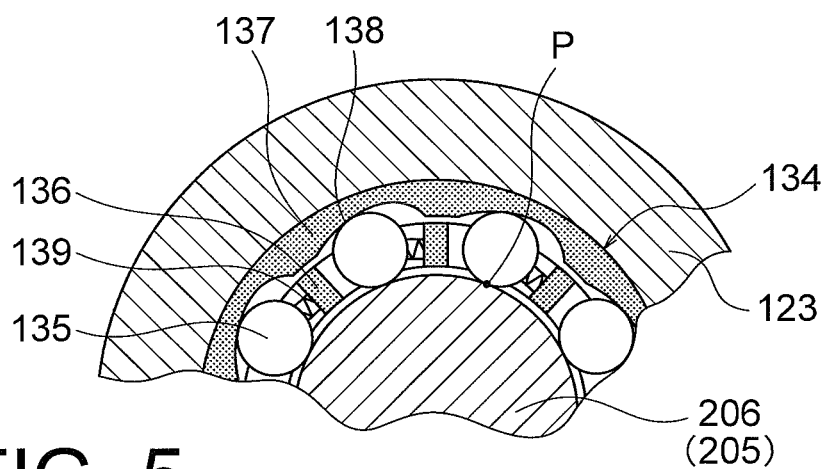
FIG. 5 is a cross-sectional view illustrating a one-way clutch.

In FIG. 5, when the insertion portion 206 of the rotary shaft 205 is rotated in the counterclockwise direction by the electric motor 201, each needle 135 moves to the lock position (a position where each needle 135 is displaced in the counterclockwise direction from the position shown in FIG. 5), so that relative rotation between the rotary shaft 205 and the outer race 137 of the one-way clutch 134 becomes impossible (locked state), whereby the rotation of the rotary shaft 205 of the motor 201 is transmitted as it is to the rotary shaft 123 of the hydraulic pump 120 via the needles 135 and the outer race 137. As a result, the hydraulic pump 120 operates, and the tool 140 operates according to the position of the directional control valve valve 132.

In FIG. 5, when the electric motor 201 no longer generates a torque to rotate the insertion portion 206 of the rotary shaft 205 in the counterclockwise direction, the locked state of the one-way clutch 134 is released so that the insertion portion 206 can be easily pulled out.

In order to maintain the state in which the insertion portion 206 is received in the one-way clutch 134, the hydraulically-actuated device is provided with a lock mechanism to lock the tool unit 100 and the drive unit 200 with respect to the axial direction of the rotary shafts 123, 205. This locking mechanism will be described below.

The drive unit 200 is provided with a first ring member 210 disposed around the rotary shaft 205 and spaced from the rotary shaft 205. A second ring member 212 is disposed around the first ring member 210. Furthermore, a third ring member 214 is disposed around the second ring member 212. The second ring member 212 is immovably fixed to the casing of the drive unit 200.

The first ring member 210 is slidable within the second ring member 212 in the direction of the rotation axis of the rotary shaft 205. The first ring member 210 is urged in the left direction in FIG. 2 by a spring 211. However, the displacement of the first ring member 210 in the left direction in FIG. 2 (FIG. 3) is limited by a stopper 213 provided in the second ring member 212.

The third ring member 214 is slidable on the second ring member 212 in the direction of the rotation axis of the rotary shaft 205. The third ring member 214 is urged in the left direction in FIG. 2 by a spring 215. However, the displacement of the third ring member 214 in the left direction in FIG. 2 is limited by the stopper 216 provided in the second ring member 212. A plurality of holes (only one is visible in FIGS. 2 and 3) are formed in the second ring member 212 at circumferential intervals. Pins 217 each having an oval cross section are housed in the corresponding holes.

When the insertion portion 206 is being inserted into the one-way clutch 134 from the state where the tool unit 100 and the drive unit 200 are separated as shown in FIG. 3, a pushing portion 121*a*, which is integrally connected with the block body 121 of the tool unit 100, pushes the first ring member 210 in the right direction in the drawing. When the pins 217 are aligned with a recess 121*b* formed on the surface of the pushing portion 121*a*, the pins 217 are pushed into the recess 121*b*. The force for pushing-in of each of the pins 217 is generated by pushing the pin 217 by an inclined surface 218, which is formed in the left end portion of the third ring member 214 and which is urged in the left direction in the drawing. After the inclined surface 218 pushes the pins 217 into the recess 121*b*, the inclined surface 218 runs over the pins 217 and then collides with the stopper 216. FIG. 2 shows the state where the coupling operation of the drive unit 200 to the tool unit 100 is completed.

In order to shift from the coupled state shown in FIG. 2 to the separated state shown in FIG. 3, the worker should hold the flange 219 of the third ring member 214 and move the third ring member 214 in the right direction against of the force of the spring 215, as shown in FIG. 3. Then, the pins 217 are brought into the condition where they can come out of the recess 121*b*. Along with this, owing to the force of the spring 211, the first ring member 210 pushes the pushing portion 121*a* of the block body 121 of the tool unit 100 out of the space inside of the second ring member 212 in leftward direction in the drawing. Along with this, an inclined surface which is the inner surface of the recess 121*b* pushes the pins 217 outward. As a result, the insertion portion 206 comes out of the one-way clutch 134 so that the separated state of FIG. 3 is established. It is to be noted that FIG. 3 shows the state when the worker is applying a force to move the flange 219 in the leftward direction in the drawing.

According to the above embodiment, the following advantageous effects are obtained.

Regardless of the rotational phase of the insertion portion 206 of the rotary shaft 205 of the motor 201, the insertion portion 206 can be inserted into the one-way clutch 134 as it is. In usual, the power-transmitting connection between the rotary shafts should be achieved by a structure that prohibits relative rotation of the two rotary shafts such as the key/key groove. A work for matching the rotational phases of the rotary shafts is necessary. However, in the above embodiment, due to the use of the one-way clutch 134, the work for rotational phase adjustment is no longer necessary. Therefore, the coupling operation of the drive unit 200 to the tool unit 100 can be dramatically simplified. In the case where the tool unit 100 is heavy, it is particularly advantageous from the viewpoint of workability that the tool unit 100 alone can be set to the work object with the tool unit 100 being separated from the drive unit 200.

It should be noted that the one-way clutch (134) that can be used in the above embodiment satisfies the following conditions:

Condition 1: The one-way clutch (134) is of a type in which the needles (135) directly contact with the outer circumferential surface of the insertion portion (206) (that is, a type not having an inner race that directly contacts with the outer circumferential surface of the insertion portion 206); and Condition 2: The needles (135) are biased by the springs (139) such that the needles are withdrawn not to avoid insertion of the insertion portion (206) when the insertion portion (206) are going to be inserted into the one way clutch (134) and such that, owing to the elastic force of the springs, the contact between the needles (135) and outer surface of the insertion portion (206) is not lost even when the needles (135) withdraw.

In connection with Condition 1, assuming that the one-way clutch has an inner race which is brought into contact with the insertion portion 206, a key/key groove connection, a dog connection or the like should be formed to establish a power-transmitting connection between the insertion portion 206 and the inner race. In this case, a work for rotational phase adjustment between the insertion portion 206 and the rotary shaft 123 should be done.

The one-way clutch may be of a type that employs balls instead of needles (rollers). In addition, since there is no need to smoothly roll (rotate) the rotary shaft 123 in the direction opposite to the rotation direction for driving the pump, it is possible to use a one-way clutch employing sprags. Such a one-way clutch also satisfies the above conditions 1 and 2 (in this case, "needle(s)" shall be replaced with "ball(s)" or "sprag(s)").

Instead of providing the one-way clutch 134 at the shaft end of the rotary shaft 123 of the hydraulic pump 120, the one-way clutch may be provided at the shaft end of the rotary shaft 205 of the motor 201. In this case, a hole for attaching the one-way clutch 134 is formed at the tip end of the rotary shaft 205 of the motor 201, and an insertion portion to be inserted into the one-way clutch 134 is provided at the distal end portion of the rotary shaft 123 of the hydraulic pump 120.

The pump incorporated into the tool unit 100 is not limited to that shown in the drawings. It is possible to incorporate any type of pump into the tool unit 100 as long as the pump is configured to discharge pressurized oil by rotationally driving a certain component of the pump, although it is impossible to reverse the pump due to the use of the one-way clutch.

EXPLANATION OF REFERENCE SIGNS

100 Tool unit
120 Hydraulic pump
123 Rotating part, or Rotary shaft of hydraulic pump
126 Rotating parts, or Bearing
140 Tool
134 One-way clutch
135 Roller (Needle Roller)
139 Spring
200 Drive unit
201 Rotary motor (electric motor)
205 (206) Drive unit rotation axis

The invention claimed is:

1. A hydraulically-actuated device comprising:
a tool unit having a hydraulic pump that generates hydraulic pressure by rotating a rotating part of the hydraulic pump, and a tool operated by the hydraulic pressure generated by the hydraulic pump; and
a drive unit detachably attached to the tool unit, the drive unit having a rotary motor that drives the rotating part of the hydraulic pump for rotation,
wherein the drive unit has a first rotary shaft rotated by the rotary motor,
wherein the hydraulic pump of the tool unit has a second rotary shaft connected to the rotating part,
wherein an end of one of the first and second rotary shafts is provided with a one-way clutch capable of receiving an end of an other of the first and second rotary shafts,
wherein the one-way clutch has rollers, balls or sprags, which are urged by springs, and which are brought into direct contact with the other of the first and second rotary shafts when the other of the first and second rotary shafts is received in the one-way clutch, such that when the other of the first and second rotary shafts rotates relative to the one-way clutch in a first rotating direction while the other of the first and second rotary shafts is axially inserted into the one-way clutch, the one-way clutch is locked and a torque-transmitting connection between the first and second rotary shafts is established, and
wherein when torque between the first and second rotary shafts in the first rotating direction is cancelled the one-way clutch is unlocked such that the other of the first and second rotary shafts can be axially removed from the one-way clutch.

2. The hydraulically-actuated device according to claim 1, wherein the one-way clutch is provided at the end of the second rotary shaft.

3. The hydraulically-actuated device according to claim 1, further comprising a locking mechanism that locks the tool unit to the drive unit with respect to an axial direction of the first and second rotary shafts in order to maintain a state in which the end of the one of the first and second rotary shafts is received in the end of the other of the first and second rotary shafts.

4. The hydraulically-actuated device according to claim 2, further comprising a locking mechanism that locks the tool unit to the drive unit with respect to an axial direction of the first and second rotary shafts in order to maintain a state in which the end of the one of the first and second rotary shafts is received in the end of the other of the first and second rotary shafts.

* * * * *